(12) United States Patent
Nishimura et al.

(10) Patent No.: US 11,014,134 B2
(45) Date of Patent: May 25, 2021

(54) METAL BAND SLITTER DEVICE AND SLITTING METHOD

(71) Applicant: Hitachi Metals, Ltd., Tokyo (JP)

(72) Inventors: Ryo Nishimura, Tokyo (JP); Katsuya Kobayashi, Tokyo (JP); Akihiro Maeta, Tottori (JP)

(73) Assignee: HITACHI METALS, LTD., Tokyo (JP)

( * ) Notice: Subject to any disclaimer, the term of this patent is extended or adjusted under 35 U.S.C. 154(b) by 367 days.

(21) Appl. No.: 15/764,156

(22) PCT Filed: Sep. 29, 2016

(86) PCT No.: PCT/JP2016/078853
§ 371 (c)(1),
(2) Date: Mar. 28, 2018

(87) PCT Pub. No.: WO2017/057591
PCT Pub. Date: Apr. 6, 2017

(65) Prior Publication Data
US 2018/0272402 A1 Sep. 27, 2018

(30) Foreign Application Priority Data
Sep. 29, 2015 (JP) .............................. JP2015-190640

(51) Int. Cl.
*B21C 47/26* (2006.01)
*B23D 19/06* (2006.01)
(Continued)

(52) U.S. Cl.
CPC ............ *B21C 47/26* (2013.01); *B21C 47/003* (2013.01); *B21C 47/006* (2013.01); *B23D 19/06* (2013.01);
(Continued)

(58) Field of Classification Search
CPC ... B21C 47/003; B21C 47/006; B21C 47/345; B21D 43/28; B21D 43/282;
(Continued)

(56) References Cited

FOREIGN PATENT DOCUMENTS

CN 101439468 A 5/2009
JP 52-065156 A 5/1977
(Continued)

OTHER PUBLICATIONS

Communication dated Jan. 18, 2019 issued by the China National Intellectual Property Administration in counterpart application No. 201680056869.5.
(Continued)

*Primary Examiner* — Debra M Sullivan
(74) *Attorney, Agent, or Firm* — Sughrue Mion, PLLC

(57) ABSTRACT

Provided is a slitter device capable of quickly supplying metal bands to a cutter stand and cutting same into strips with high speed and accuracy. The metal band slitter device comprises an unwinder that unwinds a metal band wound into a coil, a cutter stand that cuts the unwound metal band into narrow width strips, and a winder that winds the cut metal band into coils. The metal band slitter device is configured to comprise a tension adjustment unit on the winder side between the unwinder and the cutter stand that provides a constant tension to the metal band and a tension separating unit on the cutter stand side that separates the constant tension on the input side and tension on the output side.

13 Claims, 5 Drawing Sheets

(51) Int. Cl.
  *B26D 7/14*   (2006.01)
  *B26D 7/32*   (2006.01)
  *B21C 47/00*  (2006.01)
  *B65H 35/00*  (2006.01)
  *B65H 23/18*  (2006.01)
  *B26D 1/24*   (2006.01)

(52) U.S. Cl.
  CPC ............... *B26D 1/245* (2013.01); *B26D 7/14* (2013.01); *B26D 7/32* (2013.01); *B65H 23/1806* (2013.01); *B65H 35/00* (2013.01); *B65H 2301/3112* (2013.01); *B65H 2301/4148* (2013.01); *B65H 2701/173* (2013.01)

(58) Field of Classification Search
  CPC . B21D 43/287; B21B 15/0007; B21B 39/082; B21B 39/084; B23D 19/06
  See application file for complete search history.

(56) References Cited

FOREIGN PATENT DOCUMENTS

| | | |
|---|---|---|
| JP | 05-177253 A | 7/1993 |
| JP | 10-076417 A | 3/1998 |
| JP | 2004-160513 A | 6/2004 |
| JP | 2015-110324 A | 6/2015 |

OTHER PUBLICATIONS

Translation of International Preliminary Report on Patentability for International Application No. PCT/JP2016/078853 dated Apr. 12, 2018, 5 pages.
International Search Report for PCT/JP2016/078853 dated Nov. 8, 2016 [PCT/ISA/210].

Fig. 1
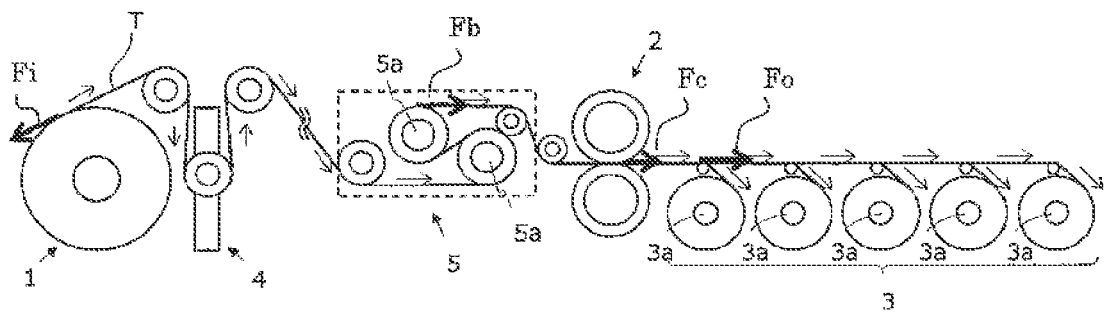
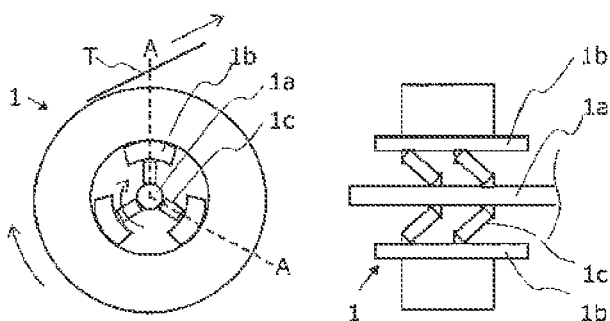
Fig. 2(a) Front view    Fig. 2(b) A-A sectional view
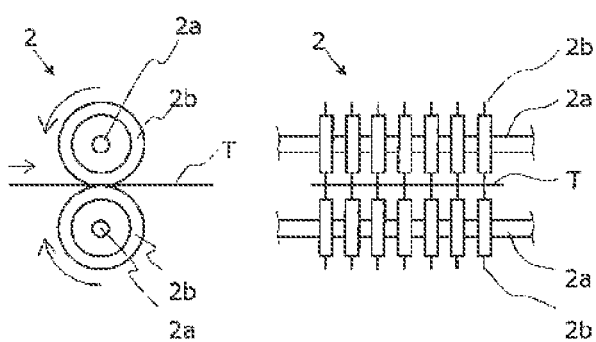
Fig. 3(a) Front view    Fig. 3(b) Side view

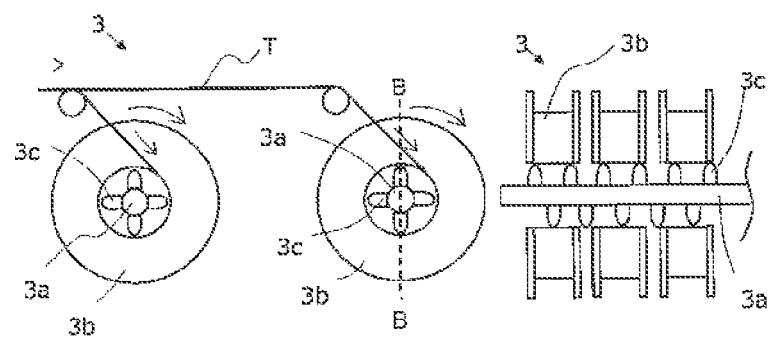
Fig. 4(a)  Front view    Fig. 4(b)  B-B sectional view
Fig. 5
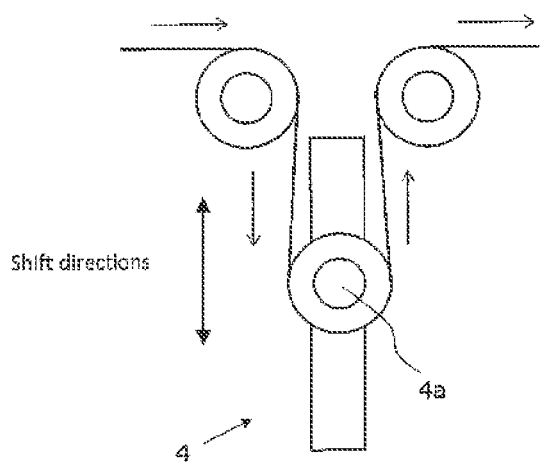

METAL BAND SLITTER DEVICE AND SLITTING METHOD

CROSS REFERENCE TO RELATED APPLICATIONS

This application is a National Stage of International Application No. PCT/JP2016/078853 filed Sep. 29, 2016, claiming priority based on Japanese Patent Application No. 2015-190640 filed Sep. 29, 2015.

TECHNICAL FIELD

The present invention relates to a metal band slitter device and a metal band slitting method in each of which a metal band wound in a coil form is cut into narrow width strips, and the strips are wound into a coil form.

BACKGROUND ART

A slitter device usually has an unwinder for unwinding a metal band wound in a coil form, a cutter stand for cutting (slitting) the unwound metal band into narrow width strips, and a winder for winding the cut metal bands into a coil form.

As a technique related to the slitter device, known is a technique of unwinding a thin steel sheet strip from an unwinder, loosening the unwound strip once, and then supplying the strip to a cutter stand. This technique makes it possible to make the tension of the strip small when the strip is cut; thus, counterforce which acts onto a rotating blade from the strip can be made small, so that the lifespan of the rotating blade can be made long (see, for example, Patent Document 1).

PRIOR ART DOCUMENT

Patent Document

Patent Document 1: JP-A-10-76417

DISCLOSURE OF THE INVENTION

Problems to be Solved by the Invention

The inventors have investigated the matter that when an amorphous metal band is cut into strips, the metal band is rapidly supplied to a cutter stand to raise the power of the cutting processing.

However, according to any conventional slitter device, when an amorphous metal band is rapidly supplied to a cutter stand, the cutting precision of the band becomes bad in some cases. It is presumed that a reason therefor is that the metal band is vibrated before the cutter stand by, for example, causes that the amorphous metal band is generally hard and that the metal band is cast by a roll rapid-cooling, such as strip casting or a single-roll method, so that the metal band is not high in dimension precision.

In the light of the above-mentioned problem, the present invention has been achieved. An object thereof is to provide a metal band slitter device and a metal band slitting method in each of which a metal band can be rapidly supplied to a cutter stand and can be cut into strips at a high speed with a good precision.

Means for Solving the Problems

A metal band slitter device according to the present invention, comprising:

an unwinder which unwinds a metal band wound in a coil form, a cutter stand which cuts the unwound metal band into narrow width strips, and a winder which winds the cut metal bands into a coil form, the slitter device comprising a tension adjusting unit which gives a constant tension to the metal band between the unwinder and the cutter stand and on the unwinder side of these two members, and comprising, on the cutter stand side of these two members, a tension separating unit which separates the constant tension on the entering side of the metal band, and a tension of the metal band on the leaving side of the metal band from each other.

The effects and advantages of the slitter device according to this structure are as follows: The locating of the tension adjusting unit makes it possible to make an adjustment to give a constant tension to the metal band unwound from the unwinder, so that the metal band can be set to have such a maximum unwinding tension that the metal band does not undergo meandering followed by fracture. In this way, the metal band can be improved in unwinding speed. Furthermore, the locating of the tension separating unit makes it possible to send the metal band in the state of being attenuated in tension into the cutter stand. By locating the tension adjusting unit and the tension separating unit as described above, the metal band is restrained from being meandered even when the cutting speed of the metal band is made large. Consequently, an appropriate slitting step can be realized.

In the present invention, the surface of the roll configured in the tension adjusting unit is preferably smoother than that of a roll configured in the tension separating unit. The word "smoother" means that the surface concerned is low in frictional coefficient onto the metal band T.

According to this structure, even when the metal band is meandered to be unwound from the unwinder, the metal band is transported into the tension separating unit while slid on the roll surface of the tension adjusting unit along the axial direction of the roll. Consequently, the metal band is transported stably to the same position of the tension separating unit. In this way, the slit position of the band on the cutter stand can be also stabilized.

In the present invention, a plurality of guide rolls are preferably located in a path extending to a position where the metal band discharged from the tension separating unit is transported into the cutter stand.

The locating of the guide roll makes it possible that when the metal band the tension of which is attenuated is transported, the metal band is guided to the cutter stand without being inclined.

In the present invention, preferably, between the guide rolls and the cutter stand, a guide mechanism which guides the metal band from upper and lower directions of the metal band, and from a width direction thereof.

The locating of the guide mechanism makes it possible to restrain the metal band further from being meandered, so that the metal band is transported in a stable state into the cutter stand.

In the present invention, the tension separating unit is preferably a bridle roll unit.

By shifting a roll configured in the bridle roll to a predetermined position, the tension of the metal band can be amplified or attenuated. In this way, the tension of the band on the transporting-out outer-layer side of the tension separating unit can be appropriately controlled.

Furthermore, the slitter device of the present invention is suitable for cutting an amorphous metal band into strips.

A metal band slitting method according to the present invention, using a slitter device comprising an unwinder which unwinds a metal band wound in a coil form, a cutter stand which cuts the unwound metal band into narrow width strips, and a winder which winds the cut metal bands into a coil form, the method comprising:

the step of using a tension adjusting unit located between the unwinder and the cutter stand and on the unwinder side of these two members to give a constant tension to the metal band, the step of using a tension separating unit located between the unwinder and the cutter stand and on the cutter stand side of these two members to separate the constant tension on the entering side of the metal band, and a tension of the metal band on the leaving side of the metal band from each other, and the step of attenuating the tension given to the metal band through the tension separating step, and supplying the metal band to the cutter stand.

The effect and advantages of the metal band slitting method according to these requirements are as described above. By performing the tension adjusting step and the tension separating step, the metal band is restrained from being meandered even when the cutting speed of the metal band is increased, so that an appropriate step of slitting the metal band can be realized.

In the present invention, preferably, a tension (Fi−Fb) of the metal band that is attenuated through the attenuation is set into a range from 0.3 to 5 MPa both inclusive.

As will be described in the item EXAMPLES demonstrated later, the setting of the tension into the numerical value makes it possible to restrain the respective widths of the metal bands, which have been slit through the cutter stand, from being varied.

In the present invention, preferably, in the tension adjusting step, a tension (unwinding tension Fi) given to the metal band in a longitudinal direction thereof when the metal band is discharged from the unwinder is set to 1.5 times or more the attenuated tension (Fi−Fb).

As will be described in the item EXAMPLES demonstrated later, the setting of the tension into the numerical value makes it possible to restrain the respective widths of the metal bands, which have been slit through the cutter stand, from being varied.

In the present invention, preferably, the metal band is an amorphous metal band having a thickness of 7 to 50 µm both inclusive, and a width of 100 to 1000 mm both inclusive.

When the thickness is 7 µm or more, the metal band ensures mechanical strengths to be restrained from being fractured. When the thickness is 50 µm or less, metal bands are obtained in a stable amorphous state. When the width of the metal band is 100 mm or more and the metal band is, particularly, an amorphous metal band, the metal band can be decreased in exciting current. In the meantime, when the width of the metal band is 1000 mm or less, the metal band is excellent in producibility.

In the present invention, the width of each of the metal bands yielded by slitting the metal band through the cutter stand is preferably 30 mm or less. In this case, the metal bands can be more effectively restrained from being fractured.

Effect of the Invention

The slitter device and the slitting method of the present invention make it possible to cut a metal band into strips at a high speed with a good precision.

BRIEF DESCRIPTION OF THE DRAWINGS

FIG. 1 is a schematic view illustrating a slitter device which is an embodiment of the present invention.

FIGS. 2(a) and 2(b) are each a schematic view illustrating an unwinder in FIG. 1.

FIGS. 3(a) and 3(b) are each a schematic view illustrating a cutter stand in FIG. 1.

FIGS. 4(a) and 4(b) are each a schematic view illustrating a winder in FIG. 1.

FIG. 5 is a schematic view illustrating a tension adjusting unit in FIG. 1.

MODE FOR CARRYING OUT THE INVENTION

Figure 6:
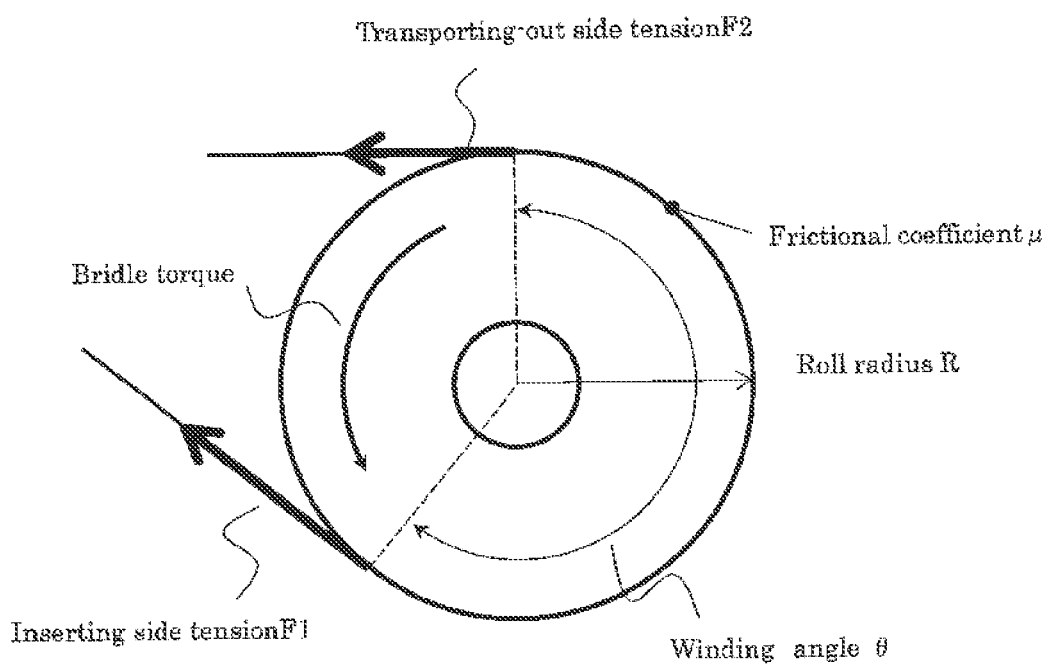
FIG. 6 is a view showing a state that a tension is given through a bridle roll.

Hereinafter, embodiments of the present invention will be described with reference to the drawings.

FIG. 1 illustrates one of the embodiments, which is one slitter device of the present invention. The slitter device in FIG. 1 has an unwinder 1, a cutter stand 2, a winder 3, a tension adjusting unit 4, and a tension separating unit 5. The slitter device in FIG. 1 is a device for unwinding a metal band T wound in a coil form onto the unwinder 1 from an end of the coil into the direction of an arrow in the figure, supplying the metal band T via the tension adjusting unit 4 and the tension separating unit 5 to the cutter stand 2, cutting the metal band T into narrow width strips, and then winding the strips onto the winder 3.

As will be detailed later, the slitter device of the present invention is a device suitable for cutting a metal band made of a hard material, for example, an amorphous metal band of 900 to 1000 HV into strips. Specifically, the slitter device is applicable to the cutting of the following into strips: an amorphous metal band having a thickness of about 7 to 50 µm and a width of about 30 to 1000 mm and casted by a roll rapid-cooling, such as strip casting or a single-roll method.

For example, any amorphous metal band has a peculiar problem that the band more easily undergoes meandering, which impedes the precision of the cut width of the band, or fracture when transported in the longitudinal direction than ordinary rolled bands such as a silicon steel sheet. The reason why the metal band is easily meandered is that the amorphous metal band itself and the camber have, therebetween, a sheet thickness deviation in the width direction. The reason why the metal band is easily fractured is that: the amorphous material is hard while the material is brittle; the material is far lower in torsional strength than in tensile strength; and further the material is thinner, larger in flatness, which is defined through steepness, and also larger in torsion and in warp in the width direction as compared with ordinary rolled members. Hereinafter, a detailed description will be made about countermeasures against the peculiar problem.

In the cutting of a band, examples thereof including any amorphous metal band, into strips, in order to decrease a load onto rotating blades, thereby preventing the blades from being abraded or fractured, and to decrease strain remaining onto the cut surface, it is generally desired that the tension on the rotating blade entering side of the band is weak. Reversely, it is more desired for an increase of the winder in speed for an improvement of the resultant strips in producibility that the tension of the winder is made as strong as possible since the meandering or vibration of the band, which causes defects of the width dimension, is proportional to the speed of the band, and further inversely proportional to the square root of the tension when the band is transported. In short, it is necessary to solve this contradictory problem in order that ordinary bands can also satisfy the producibility and the width direction precision of strips to be obtained, and satisfy the prevention of the abrasion and fracture of the rotating blade. As a means for solving the problem, known is a drive cutting method of unwinding a band with an arbitrarily selected tension, making the tension of the band free on the entering side and the leaving side of the rotating blade, and winding the band with an arbitrarily selected tension.

Additionally, in order to solve the peculiar problem that the amorphous metal band is easily meandered and fractured, on the rotating blade entering side and leaving side of the band, a tension as high as possible is required for a restraint of the meandering while a tension as low as possible is required for a restraint of the fracture. In short, the drive cutting method or any other tension-free method is improper.

Thus, for the present invention, as a means for solving not only the above-mentioned contradictor problem of ordinary bands but also the problem peculiar to amorphous metals, a method has been found out which includes: unwinding a band with a tension as strong as possible without causing the band to be fractured; transporting the band immediately before a rotating blade; attenuating the tension down to a tension as weak as possible, immediately before the rotating blade, without causing the band to be fractured or meandered; and applying or fitting the band to the rotating blade. Hereinafter, an embodiment thereof will be described in detail.

The slitter device for the embodiment has the tension adjusting unit 4 and the tension separating unit 5. As will be detailed later, the metal band T can be restrained from being meandered even when the cutting speed of the metal band T is made large.

(Unwinder)

The unwinder 1 illustrated in FIG. 1 is a device for unwinding the metal band T wound in the coil form into the above-mentioned arrow direction in the figure. As illustrated in FIGS. 2(a) and 2(b), the unwinder 1 has a rotary axis 1a, grasping blocks 1b, and connecting plates 1c.

The rotary axis 1a can be rotated at a predetermined rotating number through a motor connected to the axis and not illustrated. By rotating the rotary axis 1a and pushing up the grasping blocks 1b to the outer circumstantial direction through the connecting plates 1c, the unwinder 1 can grasp the inner diameter of the metal band T wound in the coil form, and rotate the metal band T together with the rotary axis 1a. In this manner, the unwinder 1 can unwind the metal band T in the coil form from an end of the coil to be supplied via the tension adjusting unit 4 and the tension separating unit 5 to the cutter stand 2.

(Cutter Stand)

The cutter stand 2 is a member for cutting the metal band T unwound from the unwinder 1 into narrow width strips. As illustrated in FIGS. 3(a) and 3(b), the cutter stand 2 had rotary axes 2a and rotating blades 2b. The rotary axes 2a are arranged into the form of paired axes positioned up and down to sandwich the metal band T. Upper or lower ones of the rotating blades 2b are fitted at predetermined intervals to each of the rotary axes 2a. The interval between the rotary axes 2a is adjusted to an interval permitting the upper and lower rotating blades 2b to be engaged with each other.

The rotary axes 2a can each rotate into the direction of an arrow in FIG. 3(a) at a predetermined rotating number through a motor connected to the axis and not illustrated. By rotating the rotary axes 2a, the upper or lower rotating blades 2b can be rotated into the direction of one out of arrows in the figure, so that the metal band T supplied from the unwinder 1 can be sandwiched between the upper and lower rotating blades 2b. In this way, the cutter stand 2 can cut the metal band T into narrow width strips while sending the metal band T at a predetermined speed. Thus, the cut metal bands T can be supplied into the winder.

(Winder)

The winder 3 illustrated in FIG. 1 is a member for winding up the metal bands T, which have been cut by the cutter stand 2, into a coil form. As illustrated in FIGS. 4(a) and 4(b), the winder 3 has plural winding axes 3a. The winding axes 3a can each be rotated into the direction of an arrow in the figures at a predetermined rotating number through a motor connected to the axes and not illustrated.

As illustrated in FIGS. 4(a) and 4(b), the winder 3 has, around each of the winding axes 3a, a winding tool 3b, and pins 3c which are rotated in synchronization with the winding axis 3a and which can push the internal circumference of the winding tool 3b by effect of a force proportional to an air-pressing force of the inside of the winding axis 3a. In this way, the metal band T can be wound up while roll-fastened onto the winding tool 3b.

(Tension Adjusting Unit)

The tension adjusting unit 4 illustrated in FIG. 1 is a unit located between the unwinder 1 and the cutter stand 2 and on the unwinder 1 side of these two members to apply a constant tension onto the metal band T. As illustrated in FIG. 5, the tension adjusting unit 4 has a roll 4a which can be shifted in the upper and lower directions in the figure to apply a load onto the metal band T.

The tension adjusting unit 4 in the present embodiment is the so-called dancer roll unit, and is controlled together with the unwinder 1 so that when the tension of the metal band T from the unwinder 1 is fluctuated, the rotating number of the unwinder 1 is adjustable. In this way, the position of the roll 4a in the upper and the lower directions is kept constant so that the metal band T to which a constant tension is given is discharged.

The following will describe, in more detail, a means for giving the constant tension to the metal band T from the unwinder 1.

Figure 7:
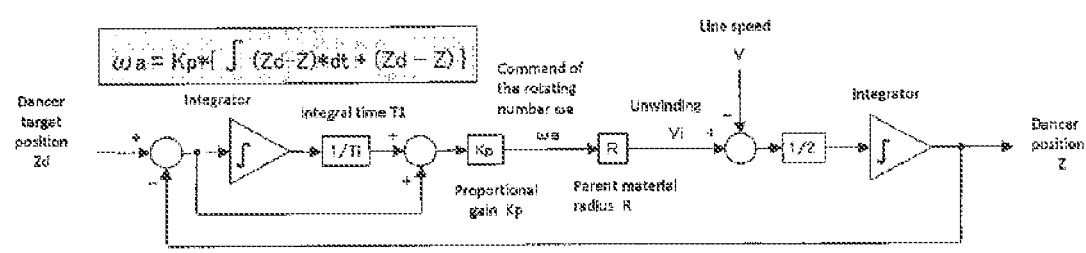
FIG. 7 is a block chart showing a control content when a constant tension is given to a metal band from the unwinder.

In the unwinder 1, in accordance with the deviation of the radius Ri of the metal band T wound in the coil form, and the acceleration/deceleration of the circumferential speed of the band, which follows a change in the radius, the tension T is fluctuated and the fluctuation is transmitted to the band. Consequently, the band is vibrated. Additionally, to the meandering of the band itself is added the meandering of the band that is based on the tension fluctuation. Accordingly, on the basis of a block diagram illustrated in FIG. 7, a PI control is made about the rotating number of the unwinder 1 to control the position of the dancer roll unit to which the constant driving force 2T is applied. In this way, the band absorbs the acceleration and deceleration of the circumferential speed of the unwinder 1 to restrain a fluctuation of the tension itself.

(Tension Separating Unit)

The tension separating unit 5 illustrated in FIG. 1 is a unit located between the unwinder 1 and the cutter stand 2 and on the unwinder 1 side of the two members to separate the constant tension which is given to the tension adjusting unit 4 and which is on the entering side of the metal band T from the tension of the metal band T on the leading side of the metal band T. As illustrated in FIG. 1, the tension separating unit 5 has tension separating rolls 5a. The tension separating rolls 5a can be rotated with a predetermined torque at a predetermined rotating number through a motor connected thereto and not illustrated.

The tension separating unit 5 in the present embodiment is the so-called bridle roll unit. The tension separating rolls 5a are shifted to predetermined positions to adjust the torques of the rolls 5a themselves, thereby adding a driving force of the bridle unit to the entering side tension of the tension separating unit 5, or decreasing the driving force from the entering side tension. The addition or the decrease makes it possible to amplify or attenuate the leaving side tension of the metal band T relatively to the entering side tension of the band. For example, when the leaving side tension of the tension separating unit 5 is made smaller than the entering side tension thereof, the amplification or the attenuation makes it possible to supply the metal band T, which is to be supplied from the tension separating unit 5 to the cutter stand 2, with a smaller tension than when the metal band T has been supplied from the tension adjusting unit 4.

Hereinafter, the role of the tension separating unit 5 will be further described.

A tension given to the metal band T through the unwinder (hereinafter referred to as the unwinding tension) is represented by Fi; a tension generated in the metal band T by the matter that the rotating blades 2b pull the metal band T inward (hereinafter referred to as the rotating blade pulling-in tension), by Fc; and a tension given to the metal band T by the torque of the winder (hereinafter referred to as the winding tension), by Fo. When the slitter device has neither the tension adjusting unit 4 nor the tension separating unit 5, the slitter device shown in FIGS. 3(a) and 3(b), which makes use of the rotary axes 2a and the rotating blades 2b, needs to adjust these tensions to satisfy the following from the viewpoint of the mechanism of the device: Fi≤Fc+Fo.

However, when a load onto the rotating blades 2b is decreased to make the lifespan thereof longer, or when the metal band T is prevented from being fractured, it is desired that the rotating blade pulling-in tension Fc is made as small as possible, and additionally the winding tension Fo is set to a minimum level at which the band is neither meandered or vibrated. In the meantime, as described above, in order to improve the unwinding speed of the metal band T and restrain the meandering of the band, the winding tension Fi is set to a maximum level at which the band is never fractured.

As described above, in order for the present invention to satisfy peculiar conditions when an amorphous metal band, as well as any ordinary band, is cut into strips, between an unwinder and a cutter stand a tension adjusting unit for giving a constant tension to the metal band is located on the unwinder side of these two member. Furthermore, between the unwinder and the cutter stand, a tension separating unit is located on the cutter stand side of the two members in order to separate the constant tension on the entering side of the metal band from the tension on the leaving side of the band. At this position, the attenuated force Fb is given to the metal band T, thereby adjusting a relationship in magnitude between the individual tensions to satisfy the expression of Fi−Fb≤Fc+Fo. In this way, the metal band is restrained from being meandered and vibrated by the maximum unwinding tension Fi, at which the metal band is not fractured; the metal band is restrained from being fractured by the winding tension Fo, which is a minimum tension necessary for causing the metal band not to be meandered or vibrated; and further the rotating blade pulling-in tension Fc is made to a minimum level.

The bridle roll unit will be described in more detail. Any bridle roll is a roll as described in the following: when a linear material or band material is transported in the longitudinal direction, the material is wound onto the roll, whereby abrasive force on the surface of the roll is used to cause the material to adhere closely onto the bridle roll without being slipped on the roll, so that the driving force of the bridle roll is transmitted to the material to give tension thereto. In the present embodiment, as represented by reference number 5 in FIG. 1, the metal band which is an S-shaped band is passed through the two tension separating rolls 5a.

With reference to FIG. 6, a description will be made about details of the manner of giving a tension through the bridle rolls 5a. A bridle torque given to the metal band is represented by $\tau b$; the radius of the bridle roll, by R; the tension of the metal band T at a position where the bridle roll and the metal band T initially contact each other, by F1; and the tension of the metal band T at a position where the bridle roll and the metal band T are made apart from each other, by F2. In this case, the following numerical expression 1 is satisfied:

$$\text{Bridle torque } \tau b = R \times (F1 - F2) \qquad \text{[Math. 1]}$$

In other words, the tension of the metal band T is increased or decreased before and after the transportation of the band through the bridle rolls by driving force of the bridle rolls. Conditions for the torque transmission, that is, conditions that the material is not slipped onto the bridle rolls is as follows:

$$\exp(-\mu \times \theta) \leq F1/F2 \leq \exp(\mu \times \theta)$$

wherein the winding angle is $\theta$, and the abrasion coefficient between the bridle roll and the material is $\mu$. When the number of such bridle rolls is increased, the tension of the metal band T transported out from the rolls can be increased or decreased.

In the tension separating unit 5 in the present embodiment, the number of the tension separating rolls 5a is two. However, the number is appropriately variable in accordance with a change in the tension. For example, the number of the tension separating rolls 5a may be increased to 3 or more.

(Surface of Rolls)

When the surface of each of the tension separating rolls 5a configured in the tension separating unit 5 is compared with that of the roll 4a of the tension adjusting unit 4, the surface of the roll 4a is made smoother onto the metal band T than that of the tension separating roll 5a. Specifically, the tension separating roll 5a is made of a material high in friction coefficient, such as urethane rubber, while the roll 4a is made of a metallic material low in friction coefficient, such as stainless steel.

According to this structure, the following is attained even when the metal band T unwound out from the unwinder 1 is unwound in the state of being meandered: while the metal band T is side-slipped in the roll axial direction on the surface of the roll 4a of the tension adjusting unit 4 by tension of the metal band T so that the position of the metal band T is adjusted, the metal band T is once transported into the tension separating unit 5. Accordingly, the metal band T comes to be continuously transported into the same position of the tension separating unit 5. As a result, the meandering of the band at the time of the unwinding can be restrained from being transmitted to the cutter stand 2. Moreover, the tension separating rolls 5a are made of the material high in friction coefficient; thus, the metal band T transported continuously into the same position is transported out without being shifted out into the axial direction, so that the position of the metal band T unwound from the tension separating roll 5a is made constant. Consequently, the metal band T is prevented from being meandered. The metal band T can be therefore restrained from being meandered when transported into the cutter stand. In order to gain this advantageous effect, it is preferred to make the roll 4a of the tension adjusting unit 4 smooth in a scope longer in the axial direction than the maximum width over which the metal band T unwound from the unwinder 1 is meandered (the distance between positions where one of the two edges of the metal band T and the other edge pass when the band is meandered from side to side provided that these positions are farthest from each other). It is preferred that the surfaces of the tension separating rolls 5a are different in friction coefficient onto the metal band T from the surface of the roll 4a of the tension adjusting unit 4, and the friction coefficient of the former surfaces is 1.5 times or more, more restrictedly 2 times or more that of the latter.

Instead of the tension separating unit 5 in the present embodiment, a pinch roll unit is usable. However, in the pinch roll unit, relatively to the increased or decreased tension, a large pushing force is required onto its surfaces between which the metal band T is sandwiched. It is therefore preferred to apply a bridle roll unit to the tension separating unit 5 as performed in the embodiment.

When an amorphous metal band is used as the metal band T, it is preferred to set, into the range of 0.3 to 5 MPa both inclusive, the tension of the metal band T that is decreased by the tension separating unit (hereinafter referred to as the attenuated tension Fi−Fb). This case makes it possible to restrain the metal band T from being meandered and vibrated. Furthermore, the abrasion of the rotating blades can be sufficiently decreased. The lower limit value of the attenuated tension Fi−Fb is more preferably 0.4 MPa or more, even more preferably 0.5 MPa or more. The upper limit value of the attenuated tension Fi−Fb is more preferably 4 MPa or less, even more preferably 3 MPa or less.

Specifically, when the metal band T is an amorphous metal band not nano-crystallized, the attenuated tension Fi−Fb is set into a range preferably from 0.3 to 1.5 MPa both inclusive, more preferably from 0.4 to 1.3 MPa both inclusive.

When the metal band T is a nano-crystallizable amorphous metal band, the attenuated tension Fi−Fb is set into a range preferably from 1 to 5 MPa both inclusive, more preferably from 1.5 to 4 MPa both inclusive.

The following will describe preferred embodiments of the unwinding tension Fi.

When the amorphous metal band T is used, the unwinding tension Fi is set preferably to 1.5 times or more, more preferably to 2 times or more the attenuated tension Fi−Fb. This case makes it possible to increase the discharging speed of the metal band from the unwinder to increase the cutting speed. Additionally, when the amorphous metal band is used, the cutting speed of the metal band can be set to 75 m/min. or more.

Specifically, in the case of the amorphous metal band not nano-crystallized, the unwinding tension Fi is set preferably to a value more than 1.5 MPa, more preferably to 1.7 MPa or more. However, considering that the metal band is restrained from being fractured, the upper limit of the unwinding tension Fi is set preferably to 30 MPa or less.

In the case of the nano-crystallizable amorphous metal band, the unwinding tension Fi is set preferably to a value more than 5 MPa, more preferably to 5.5 MPa or more. Considering that the metal band is restrained from being fractured, the upper limit of the unwinding tension Fi is set preferably to 30 MPa or less.

The following will describe an amorphous metal band, which is an example of the metal band.

The amorphous metal band T is not particularly limited as far as the band is an amorphous metal band having a composition in which Fe (iron), out of contained metal elements, is contained in the largest proportion. The metal band T preferably further contains, besides Fe, Si (silicon) and B (boron). The amorphous metal band T may be, for example, a longitudinal thin band yielded by melting an alloy having the above-mentioned composition to the melting point thereof or higher, and then cooling the resultant rapidly by a single roll method so as to be solidified.

For example, about the composition of the amorphous metal band, the total content of Fe, Si and B is regarded as 100 atomic percent. In this case, the amorphous metal may be an Fe based amorphous alloy in which the Fe content is from 78 to 83 atomic percent; the Si content, from 3 to 10 atomic percent; the B content, from 10 to 15 atomic percent; and the balance is made of impurities. When the Fe content is 78 atomic percent or more, the resultant alloy ribbon becomes higher in saturation magnetic flux density so that a magnetic core produced using the alloy ribbon is further restrained from being increased in size or weight. When the Fe content is 83 atomic percent or less, the alloy is further restrained from being lowered in Curie point and crystallizing temperature so that magnetic properties of the magnetic core are further improved in stability.

The amorphous alloy may further contain C (carbon), which is an element contained in, for example, pure iron that is a raw material of melted alloy. The C (carbon) content is preferably 0.5 atomic percent or less. When the C (carbon) content is 0.5 atomic percent or less, the alloy ribbon is further restrained from being embrittled. The C (carbon) content is preferably from 0.1 to 0.5 atomic percent. When the C (carbon) content is 0.1 atomic percent or more, the melted alloy and the alloy ribbon are excellent in producibility.

A nano-crystallizable amorphous metal band is also usable. For the nano-crystallizable amorphous metal band, for example, an alloy is usable which has a composition represented by the following general formula:

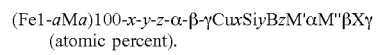
(atomic percent).

M is Co and/or Ni; M' is at least one selected from the group consisting of Nb, Mo, Ta, Ti, Zr, Hf, V, Cr, Mn and W; M" is at least one element selected from the group consisting of Al, elements in the platinum group, Sc, rare earth elements, Zn, Sn, and Re; X is at least one element selected from the group consisting of C, Ge, P, Ga, Sb, In, Be, and As; X is at least one element selected from the group consisting of C, Ge, P, Ga, Sb, In, As and Be; and a, x, y, z, α, β and γ each satisfy the following: $0 \leq a \leq 0.5$, $0.1 \leq x \leq 3$, $0 \leq y \leq 30$, $0 \leq z \leq 25$, $5 \leq y+z \leq 30$, $0 \leq \alpha \leq 20$, $0 \leq \beta \leq 20$, and $0 \leq \gamma \leq 20$.

The thickness of the alloy ribbon of such an amorphous metal band may be from 7 to 50 μm.

When the thickness is 7 μm or more, the alloy ribbon ensures mechanical strengths to be restrained from being fractured. This case makes it possible to attain continuous casting of the alloy ribbon. The thickness of the alloy ribbon is preferably 9 μm or more.

When the thickness is 50 μm or less, a stable amorphous state is obtained in the alloy ribbon. The thickness of the alloy ribbon is more preferably 30 μm or less.

The width (that is, the length in the width direction) of the amorphous metal band is preferably from 30 to 1000 mm.

When the width is 30 mm or more, the resultant strips can give a practical transformer large in capacity. Furthermore, when the width is 100 mm or more, the amorphous metal band is increased in necessity of being decreased in exciting current. Accordingly, an amorphous metal band decreased in exciting current is suitable, particularly, for an alloy ribbon having a large width of 100 mm or more.

In the meantime, when the width of the amorphous metal band is 1000 mm or less, the band is excellent in producibility (production fitness). The width of the amorphous metal band is more preferably 500 mm or less, even more preferably 400 mm or less, in particular preferably 300 mm or less from the viewpoint of the producibility (production fitness) of the amorphous metal band.

The following will describe the motion of the slitter device of the present embodiment in accordance with the order of shifts of the metal band T.

In the unwinder 1, the rotary axis 1a is initially rotated at a predetermined rotating number to unwind the metal band T wound in the coil form into the direction of an end of the coil to be supplied into the tension adjusting unit 4.

Next, in the tension adjusting unit 4, a load is applied to the metal band T from the roll 4a to give a constant tension to the metal band T. At this time, in accordance with a fluctuation in the tension of the metal band T, the rotating number of the unwinder 1 is adjusted to keep the position of the roll 4a in the vertical direction constant to maintain the constant tension. The metal band T, to which the constant tension is given, is supplied to the tension separating unit 5.

The slitter device of the present embodiment has the tension separating unit 5, so that a proper constant tension can be given to the metal band T. This matter makes it possible to make the vibration of the metal band T small in amplitude. Thus, even when the metal band T is unwound at a high speed from the unwinder 1, the generation of vibrations affecting the cutting precision of the band largely can be restrained.

In particular, metal bands hard and bad in dimension precision, such as an amorphous metal band, are easily vibrated. Accordingly, a slitter device for supplying a metal band while giving a constant tension to the band as in the present embodiment is a device useful for cutting an amorphous metal band into strips.

Next, in the tension separating unit 5, the torque and the rotating number of the tension separating rolls 5a are adjusted through a motor not illustrated to separate tensions of the band before and after the tension separating unit 5 from each other.

In the slitter device of the present embodiment, the tension separating unit 5 is located between the unwinder 1 and the cutter stand 2 and on the unwinder 1 side of the two members. The interval between the tension separating unit 5 and the cutter stand 5 is preferably made as narrow as possible. This case makes it possible to restrain the metal band T from being newly vibrated between the tension separating unit 5 and the cutter stand 5.

Next, by effect of the rotating blades 2b of the cutter stand 2, the metal band T is cut into metal bands T each narrow in width. The metal bands T, which have been cut into a strip form, are supplied to the winder 3.

As described above, the slitter device of the present embodiment can be restrained from being vibrated even when the metal band T is rapidly supplied to the cutter stand 2. Thus, the metal band T can be cut into strips at a high speed and with a good precision.

Additionally, the slitter device of the present embodiment has the tension separating unit 5, whereby the tension of the metal band T supplied to the cutter stand 2 can be made small. This manner makes it possible to make counterforce acting from the metal band T onto the rotating blades 2b small to make the lifespan of the rotating blades 2b long.

In the case of cutting, particularly, a metal band made of a hard material, such as an amorphous metal band, into strips, the lifespan of the rotating blades 2b becomes short. Accordingly, a slitter device as in the present embodiment, in which the tension of the metal band T supplied to the cutter stand 2 is made small, is a device useful for cutting an amorphous metal band into strips.

Lastly, in the winder 3, the winding axes 3a are rotated at a predetermined rotating number through a motor not illustrated to wind the metal bands T, which have been cut into the strip form, into a coil form.

When the metal band T is wound in the slitter device of the present embodiment, it is preferred to rotate the winding axes 3a at a speed more than a rotating speed necessary for winding the metal band T. In such a way, a speed difference can be generated between the internal diameter of the winding axes 3a and that of the winding tools 3b, so that the pins 3c are slid along the internal diameter of the wound metal band T. Thus, while a tension is given to the metal band T, this band can be wound. In short, the metal band T supplied from the cutter stand 2 can be wound up while roll-fastened.

As described above, in the slitter device of the present embodiment, the tension adjusting unit 4 for giving a constant tension to the metal band T is located between the unwinder 1 and the cutter stand 2 and on the unwinder 1 side of these two members, and on the cutter stand side thereof the tension separating unit 5 is located for separating the constant tension on the entering side of the metal band from the tension of the leaving side thereof. This structure makes it possible to supply the metal band T at a high speed to the cutter stand 2 to be highly precisely cut into strips even when the metal band T is, for example, a metal band made of a material hard and bad in dimension precision, such as an amorphous metal band. Furthermore, by the tension separating unit 5, the tension of the metal band T supplied to the cutter stand 2 can be made small, so that the lifespan of the rotating blades 2b of the cutter stand 2 can be made long.

Another Embodiment

Figure 8:
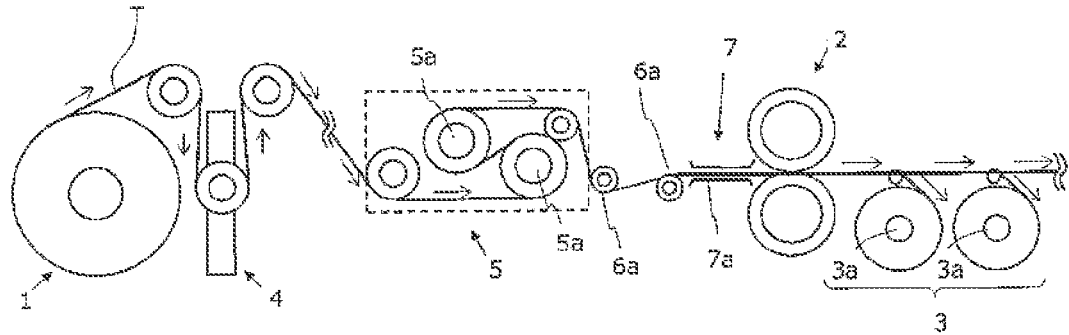
FIG. 8 is a schematic view illustrating a slitter device that is another embodiment of the invention.

The following will describe another embodiment of the slitter device of the present invention with reference to FIG. 8. When the embodiments is compared with the embodiment in FIG. 1, plural guide rolls 6a are located in a path extending to a position where a metal band T discharged from a tension separating unit 5 is transported into a cutter stand 2. Furthermore, between the guide rolls 6a and the cutter stand 2, a guide mechanism 7 is located for guiding the metal band T from the upper and lower directions and from the width direction of the band.

The plural guide rolls 6a are located in number of two in FIG. 8. However, the rolls 6a may be located in number of three or more. When the metal band T the tension of which is attenuated is transported, the locating of the guide rolls 6a makes it possible to guide the metal band T to the cutter stand 2 without being inclined.

The guide mechanism 7 is composed of plural guide plates 7a to guide the metal band T from the upper and lower directions (front and rear directions) and from the width direction of the band. The guide plates 7a and the metal band T are set into the state of having a slight gap therebetween. The setting of the guide mechanism 7 makes it possible to restrain the metal band T from being meandered and transported to transport the metal band T in a stable state into the cutter stand 2.

The above has described the slitter device of the present invention, using the embodiments thereof. However, the invention is not limited to the embodiments. The content thereof may be modified within the technical scope recited in the claims.

For example, in the embodiments, as an example of the metal band to be cut into strips, an amorphous metal band has been described. However, the slitter device of the present invention can also be used for the cutting of a metal band other than the amorphous metal band into strips. By applying the invention to the cutting of, particularly, a hard metal band into strips, the lifespan of the rotating blades of the cutter stand can be made long, examples of the band including niobium, chromium and nickel metal bands.

Examples

Hereinafter, examples will be demonstrated in each of which the slitter device of the present invention is used to cut each amorphous metal band into strips.

As each metal band T, an amorphous metal band (product name: 26055A1) manufactured by Hitachi Metals, Ltd. was used. The width of the amorphous metal band was 170 mm before the band was cut. The thickness was from 22 to 24 μm.

In the present embodiment, the cutting speed of the amorphous metal bands was set to 75 m/min., and 100 m/min. The width of each of the bands was set to 25 mm after the cutting into strips.

At each of the speeds, the number of strips cut at one time from the metal bands T was changed to 1, 4 and 6. In this way, the cutting into the strip form was attained.

In the present embodiment, the unwinding tension Fi was set to 2 MPa (about 8 N). The attenuated tension Fi–Fb was set to 0.8 MPa (about 3 N).

About each of the metal bands yielded by the cutting into the strip form (hereinafter referred to as the slit metal bands), the dimension thereof in the width direction was measured at 100 sites thereof at intervals of 5 mm. The results are shown in Table 1.

For example, about the metal band yielded by the cutting into the single strip form, the target cut speed width of which was 25 mm, the average of the resultant widths was 24.980 mm. It was verified that the cutting into the strip was attained in the range of an accidental error of at most 0.002 mm or less from the target width.

TABLE 1

| Sample No. | The number of laminated layers | Cutting speed (m/min.) | Target width value (mm) | Average width value (mm) | Standard deviation (σ) | Fi (N) | Fi-Fb (N) |
|---|---|---|---|---|---|---|---|
| 1-1 | 1 | 75 | 25 | 24.979 | 0.002 | 8 | 3 |
| 1-2 | 4 | 75 | 25 | 24.977 | 0.003 | 8 | 3 |
| 1-3 | 6 | 75 | 25 | 24.982 | 0.002 | 8 | 3 |
| 2-1 | 1 | 100 | 25 | 24.980 | 0.002 | 8 | 3 |
| 2-2 | 4 | 100 | 25 | 24.978 | 0.003 | 8 | 3 |
| 2-3 | 6 | 100 | 25 | 24.983 | 0.002 | 8 | 3 |
| *3-1 | 1 | 70 | 20 | 19.988 | 0.006 | 8 | 8 |
| *3-2 | 2 | 70 | 20 | 19.983 | 0.005 | 8 | 8 |

(Any sample No. to which the symbol "*" is attached is a sample yielded using a conventional slitter device.)

In comparative examples, a slitter device having no tension separating unit was used to cut each metal band T into a strip form. The used metal band T was the same as described above. The cutting speed of the amorphous metal band was set to 70 m/min. The width of each of the metal bands yielded by the cutting into the strip form was set to 20 mm. Results measured in the comparative examples are shown in Table 1 as results of samples No. 3-1 and No. 3-2.

As the cutting speed is larger and further the width of the bands yielded by the cutting into the strip form is broader, the standard deviation (σ) of the widths of the slit metal bands tends to become smaller. However, about the slit metal bands of samples No. 3-1 and No. 3-2 yielded as the comparative examples, the cutting speed is small (70 m/min.) and the width is narrow; however, the standard deviation of the widths is a larger value from 0.005 to 0.006 than that of the slit metal bands yielded using the slitter device of the present invention.

Next, in the slitter device of the present invention, different metal bands were used to make the same evaluation.

As each metal band T, a nano-crystallizable amorphous metal band (amorphous metal band (product name: FT-3) manufactured by Hitachi Metals, Ltd.) was used. The width of the amorphous metal band was 63 mm. The thickness was from 15 to 21 μm.

In the present embodiment, the cutting speed of the amorphous metal bands was set to 75 m/min., and 100 m/min. The width of each of the bands was set to 25 mm after the cutting into a strip form.

At each of the speeds, the number of strips cut at one time from the metal bands T was changed to 1, 2 and 3. In this way, the cutting into the strip form was attained.

In the present embodiment, the unwinding tension Fi was set to 7 MPa (about 8 N). The attenuated tension Fi–Fb was set to 2.6 MPa.

About each of the resultant slit metal bands, the dimension thereof in the width direction was measured at 100 sites thereof at intervals of 5 mm. The results are shown in Table 2.

TABLE 2

| Sample No. | The number of laminated layers | Cutting speed (m/min.) | Target width value (mm) | Average width value (mm) | Standard deviation ($\sigma$) | Fi (N) | Fi-Fb (N) |
| --- | --- | --- | --- | --- | --- | --- | --- |
| 4-1 | 1 | 75 | 20 | 19.986 | 0.003 | 8 | 3 |
| 4-2 | 2 | 75 | 20 | 19.974 | 0.002 | 8 | 3 |
| 4-3 | 3 | 75 | 20 | 19.988 | 0.003 | 8 | 3 |
| 5-1 | 1 | 100 | 20 | 19.986 | 0.002 | 8 | 3 |
| 5-2 | 2 | 100 | 20 | 19.977 | 0.002 | 8 | 3 |
| 5-3 | 3 | 100 | 20 | 19.984 | 0.003 | 8 | 3 |

Even when the nano-crystallizable amorphous metal band was used, the slit metal bands were obtained with a small standard deviation of the widths that was from 0.002 to 0.003.

DESCRIPTION OF REFERENCE SIGNS

1: unwinder
  1a: rotary axis, 1b: grasping blocks, 1c: connecting plates
2: cutter stand
  2a: rotary axes, 2b: rotating blade
3: winder 3
  3a: winding axes, 3b: winding tool, 3c: pin
4: tension adjusting unit
  4a: roll
5: tension separating unit
  5a: tension separating roll
6a: guide rolls
7: guide mechanism 7
  7a: guide plate
Fi: unwinding tension;
Fb: attenuated force
Fc: rotating blade pulling-in tension
Fo: winding tension)

The invention claimed is:

1. A metal band slitter device, comprising:
an unwinder which unwinds a metal band wound in a coil form,
a tension adjusting unit,
a tension separating unit,
a cutter stand which cuts the unwound metal band into a plurality of narrow width strips, and
a winder which winds each strip into a coil form,
wherein the tension adjusting unit and the tension separating unit are located between the unwinder and the cutter stand,
wherein the tension adjusting unit is located between the unwinder and the tension separating unit,
wherein the tension separating unit is located between the tension adjusting unit and the cutter stand,
wherein the tension adjusting unit controlled together with the unwinder gives a constant tension to the metal band between the unwinder and the tension adjusting unit, and
wherein the tension separating unit changes the constant tension of the metal band entering the tension separating unit to a tension of the metal band leaving the tension separating unit, wherein the tension of the metal band leaving the tension separating unit is a tension smaller than the constant tension of the metal band entering the tension separating unit.

2. The metal band slitter device according to claim 1, wherein a surface of a roll configured in the tension adjusting unit is smoother than that of a roll configured in the tension separating unit.

3. The metal band slitter device according to claim 1, wherein the metal band slitter device further comprises a plurality of guide rolls, and the plurality of guide rolls are located in a path extending to a position where the metal band discharged from the tension separating unit is transported into the cutter stand.

4. The metal band slitter device according to claim 3, further compromising, between the guide rolls and the cutter stand, a guide mechanism which guides the metal band by guiding from upper and lower directions of the metal band, and from a width direction of the metal band.

5. The metal band slitter device according to claim 1, wherein the tension separating unit is a bridle roll unit.

6. The metal band slitter device according to claim 1, wherein the metal band is an amorphous metal band.

7. The metal band slitter device according to claim 1, wherein the cutter stand comprises rotating blades at predetermined intervals, wherein the predetermined intervals are 30 mm or less.

8. The metal band slitter device according to claim 1, wherein the tension adjusting unit is directly downstream from the unwinder.

9. A metal band slitting method, using a slitter device comprising
an unwinder,
a tension adjusting unit,
a tension separating unit,
a cutter stand, and
a winder,
wherein the tension adjusting unit and the tension separating unit are located between the unwinder and the cutter stand,
wherein the tension adjusting unit is located between the unwinder and the tension separating unit,
wherein the tension separating unit is located between the tension adjusting unit and the cutter stand,
the method comprising:
a step of unwinding a metal band wound on the winder,
a step of applying a constant tension to the metal band by controlling the tension adjusting unit together with the unwinder,
a step of adjusting the constant tension of the metal band with the tension separating unit to change the constant tension of the metal band entering the tension separating unit to a tension of the metal band leaving the tension separating unit, wherein the tension of the metal band leaving the tension separating unit is a separate tension from the constant tension of the metal band entering the tension separating unit, a step of attenuating the tension given to the metal band through the tension separating step, and supplying the metal band to the cutter stand, a step of cutting the unwound band into a plurality of narrow width strips, and a step of winding each strip into a coil form.

10. The metal band slitting method according to claim 9, wherein a tension (Fi–Fb) of the metal band that is attenuated through the attenuation is set into a range which is greater than or equal to 0.3 and less than or equal to 5 MPa.

11. The metal band slitting method according to claim 10, wherein in the tension adjusting step, a tension which is unwinding tension Fi applied to the metal band in a longitudinal direction of the metal band when the metal band is discharged from the unwinder is set to 1.5 times or more the attenuated tension (Fi–Fb).

12. The metal band slitting method according to claim 9, wherein the metal band is an amorphous metal band having a thickness of greater than or equal to 7 and less than or equal to 50 μm, and a width of greater than or equal to 100 and less than or equal to 1000 mm.

13. The metal band slitting method according to claim 9, wherein strips yielded by cutting the metal band through the cutter stand each have a width of 30 mm or less.

* * * * *